United States Patent
Carroll (10) Patent No.: US 10,599,829 B2
(45) Date of Patent: Mar. 24, 2020

(54) IMAGE BASED APPARATUS AND METHOD THEREOF

(71) Applicant: James Carroll, Milton, DE (US)

(72) Inventor: James Carroll, Milton, DE (US)

( * ) Notice: Subject to any disclaimer, the term of this patent is extended or adjusted under 35 U.S.C. 154(b) by 0 days.

(21) Appl. No.: 16/445,371

(22) Filed: Jun. 19, 2019

(65) Prior Publication Data

US 2019/0392131 A1  Dec. 26, 2019

Related U.S. Application Data (60) Provisional application No. 62/687,303, filed on Jun. 20, 2018.

(51) Int. Cl.
*G06F 21/00* (2013.01)
*G06F 21/36* (2013.01)
*G06F 3/0482* (2013.01)

(52) U.S. Cl.
CPC ............ *G06F 21/36* (2013.01); *G06F 3/0482* (2013.01)

(58) Field of Classification Search
CPC .............................. G06F 21/36; G06F 21/335
USPC ......................................................... 726/18
See application file for complete search history.

(56) References Cited

U.S. PATENT DOCUMENTS

| | | | |
|---|---|---|---|
| 8,190,901 B2* | 5/2012 | Barr | G06T 1/0028 382/115 |
| 8,627,096 B2 | 1/2014 | Azar et al. | |
| 2008/0209226 A1* | 8/2008 | Venkatesan | H04L 9/3231 713/186 |
| 2011/0191820 A1* | 8/2011 | Ivey | G06F 16/00 726/3 |
| 2014/0165187 A1 | 6/2014 | Daesung et al. | |
| 2014/0337993 A1* | 11/2014 | Winters | G06F 16/58 726/26 |
| 2015/0113633 A1 | 4/2015 | Yeom | |

* cited by examiner

*Primary Examiner* — Longbit Chai
(74) *Attorney, Agent, or Firm* — Caesar Rivise, PC (57) ABSTRACT

A method and/or apparatus controls access to a digital resource. An image of a plurality of images is allowed to be selected, each of the images including one or more base lines, each of the base lines having a) non-linear sections, b) sections extending in multiple directions, or c) both non-linear sections and sections extending in multiple directions. Locations are determined where an alignment line intersects the one or more base lines in the selected image. Access to the digital resource is permitted if the locations are determined to be predetermined locations in the image associated with the digital resource prior to the determining.

20 Claims, 10 Drawing Sheets

| | | | Optional | | |
| :---: | :---: | :---: | :---: | :---: | :---: |
| 152 | 154 | 156 | 158 | 160 | 162 |
| Resource | Intersection Point | Intersection Point | Color of Line | Color of Alignment Line | Pattern of Alignment Line |
| 1 | 4001/2024 | — | — | — | — |
| 2 | 4024/2359 | 6110/3491 | Blue | | |
| 3 | 2691/7810 | — | — | Green | |
| 4 | 3451/3200 | 0610/9220 | — | — | — |
| 5 | 5961/4211 | 5143/2191 | Green | Red | Dots |

*FIG. 10*

IMAGE BASED APPARATUS AND METHOD THEREOF

This application claims priority under 35 U.S.C. 119 (e) to U.S. provisional application 62/687,303 filed on Jun. 20, 2018, which application is hereby incorporated by reference in its entirety.

FIELD OF THE INVENTION

The present invention relates to computer security, and more specifically to computer security that controls access to a digital resource such as hardware or software. In particular, a method and apparatus are described that enables an image to be used for controlling access to a digital resource.

BACKGROUND OF THE INVENTION

Digital resources are prevalent in today's society, and while they perform functions that are useful, helpful, desirable, necessary, etc., they may also be prone to security breach.

One example of a digital resource is an electronic device such as a computer. Access to a computer may be desirable or necessary. Unauthorized access to a computer, however, can cause anything from minor inconvenience to catastrophic disaster. In one situation, for example, it may be desirable to block unauthorized access to a computer because of privacy issues. In another situation, it may be desirable to block unauthorized access to a computer in order to prevent malicious destruction. Thus, it is desirable to have some type of security measure in place to prevent unauthorized access to a computer.

Another example of a digital resource is software. In one situation, it may be desirable to prevent access to software in order to prevent privacy breach. In another example, it may be desirable to prevent access to software in order to prevent intentional malicious destruction. In yet another example, the software may be used for communication, such as to access a network. An exemplary network includes the Internet. It may be desirable to prevent communication via email or web browser (for example). Another exemplary network may be a private network. In any of these cases, unauthorized access and/or unauthorized communication may be desirable.

One way to prevent access to a digital resource is through the use of a password. Passwords allow a user to simply enter a plurality of characters in order to gain access to a digital resource. While a password may be a simple way to prevent unauthorized digital resource access, some passwords are subject to breach. In addition, complex passwords may be easily forgotten.

SUMMARY OF THE INVENTION

A method and/or apparatus controls access to a digital resource. An image of a plurality of images is allowed to be selected, each of the images including one or more base lines, each of the base lines having a) non-linear sections, b) sections extending in multiple directions, or c) both non-linear sections and sections extending in multiple directions. Locations are determined where an alignment line intersects the one or more base lines in the selected image. Access to the digital resource is permitted if the intersection locations are determined to be predetermined intersection locations in the image associated in advance with the digital resource.

DETAILED DESCRIPTION

Figure 1:
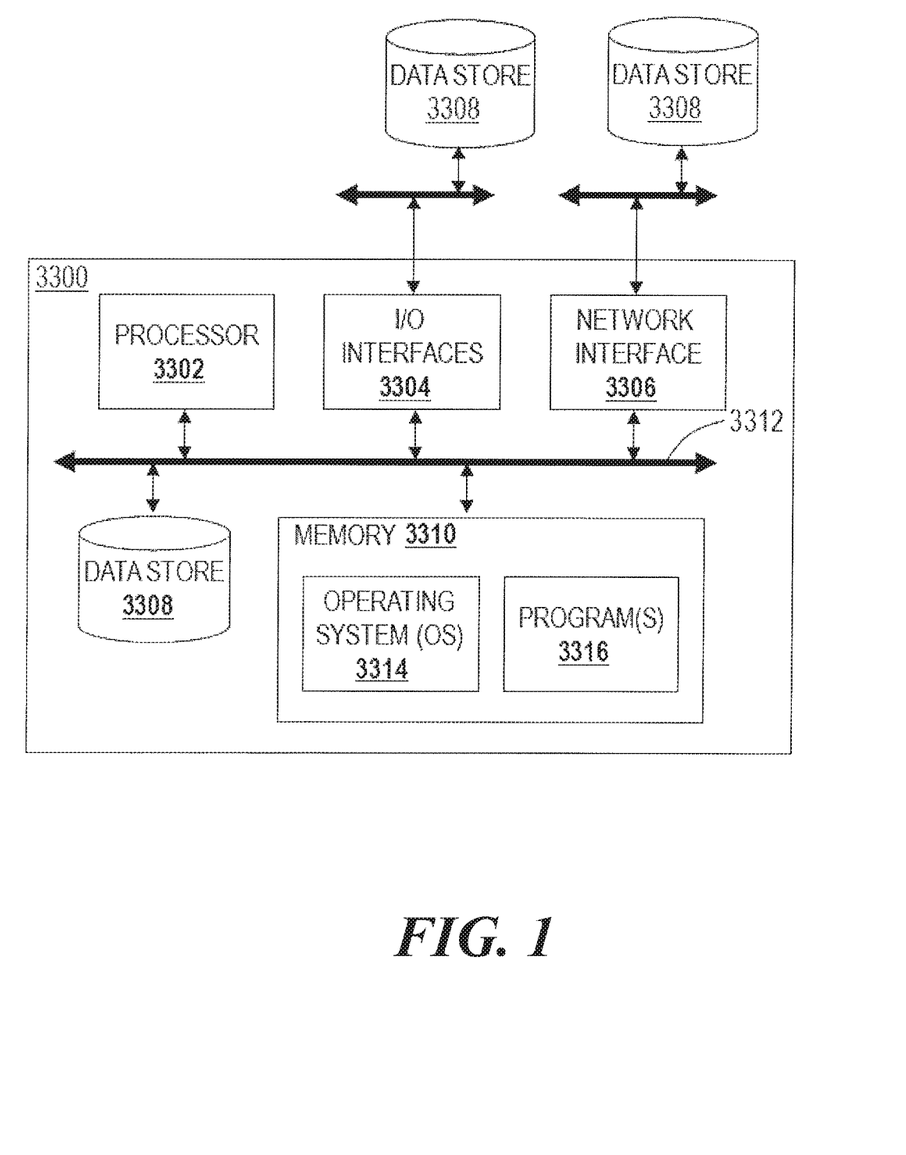
FIG. 1 is a block diagram that illustrates a server that may be used in combination with an exemplary embodiment of the present invention.

FIG. 1 is a block diagram that illustrates a server that may be used in combination with an exemplary embodiment of the present invention.

Referring to FIG. 1, in an exemplary embodiment, a block diagram illustrates a server 3300 which may be used in the system, in other systems, or standalone. The server 3300 may be a digital computer that, in terms of hardware architecture, generally includes a processor 3302, input/output (I/O) interfaces 3304, a network interface 3306, a data store 3308, and memory 3310. It should be appreciated by those of ordinary skill in the art that FIG. 1 depicts the server 3300 in an oversimplified manner, and a practical embodiment may include additional components and suitably configured processing logic to support known or conventional operating features that are not described in detail herein. The components (3302, 3304, 3306, 3308, and 3310) are communicatively coupled via a local interface 3312. The local interface 3312 may be, for example but not limited to, one or more buses or other wired or wireless connections, as is known in the art. The local interface 3312 may have additional elements, which are omitted for simplicity, such as controllers, buffers (caches), drivers, repeaters, and receivers, among many others, to enable communications. Further, the local interface 3312 may include address, control, and/or data connections to enable appropriate communications among the aforementioned components.

The processor 3302 is a hardware device for executing software instructions.

The processor 3302 may be any custom made or commercially available processor, a central processing unit (CPU), an auxiliary processor among several processors associated with the server 3300, a semiconductor-based microprocessor (in the form of a microchip or chip set), or generally any device for executing software instructions. When the server 3300 is in operation, the processor 3302 is configured to execute software stored within the memory 3310, to communicate data to and from the memory 3310, and to generally control operations of the server 3300 pursuant to the software instructions. The I/O interfaces 3304 may be used to receive user input from and/or for providing system output to one or more devices or components. User input may be provided via, for example, a keyboard, touch pad, and/or a mouse. System output may be provided via a display device and a printer (not shown). I/O interfaces 3304 may include, for example, a serial port, a parallel port, a small computer system interface (SCSI), a serial ATA (SATA), a fibre channel, Infiniband, iSCSI, a PCI 10 Express interface (PCI-x), an infrared (IR) interface, a radio frequency (RF) interface, and/or a universal serial bus (USB) interface.

The network interface 3306 may be used to enable the server 3300 to communicate on a network, such as the Internet, a wide area network (WAN), a local area network (LAN), and the like, etc. The network interface 3306 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 3306 may include address, control, and/or data connections to enable appropriate communications on the network. A data store 3308 may be used to store data. The data store 3308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 3308 may incorporate electronic, magnetic, optical, and/or other types of storage media. In one example, the data store 3308 may be located internal to the server 3300 such as, for example, an internal hard drive connected to the local interface 3312 in the server 3300.

Additionally in another embodiment, the data store 3308 may be located external to the server 3300 such as, for example, an external hard drive connected to the I/O interfaces 3304 (e.g., SCSI or USB connection). In a further embodiment, the data store 3308 may be connected to the server 3300 through a network, such as, for example, a network attached file server.

The memory 3310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 3310 may incorporate electronic, magnetic, optical, and/or other types of storage media. Note that the memory 3310 may have a distributed architecture, where various components are situated remotely from one another, but can be accessed by the processor 3302. The software in memory 3310 may include one or more software programs, each of which includes an ordered listing of executable instructions for implementing logical functions. The software in the memory 3310 includes a suitable operating system (O/S) 3314 and one or more programs 3316. The operating system 3314 essentially controls the execution of other computer programs, such as the one or more programs 3316, and provides scheduling, input-output control, file and data management, memory management, and communication control and related services. The one or more programs 3316 may be configured to implement the various processes, algorithms, methods, techniques, etc. described herein.

Figure 2:
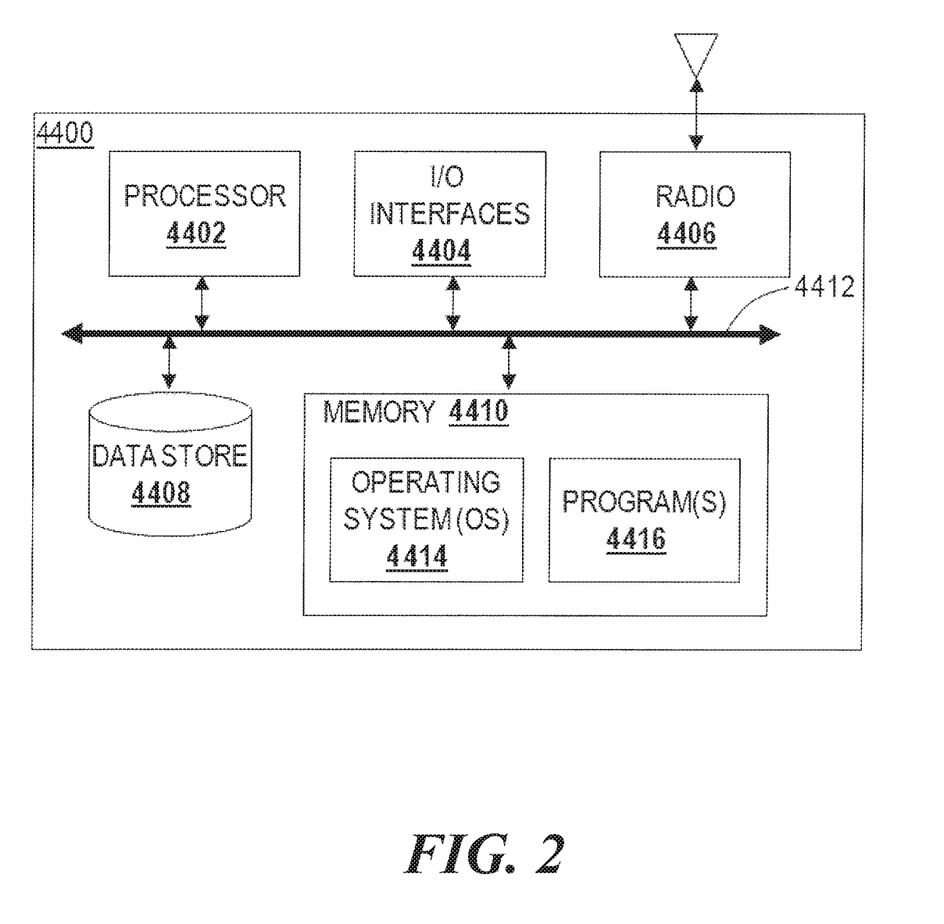
FIG. 2 is a block diagram that illustrates an electronic device that may be used in combination with an exemplary embodiment of the present invention.

FIG. 2 is a block diagram that illustrates an electronic device that may be used in combination with an exemplary embodiment of the present invention.

Referring to FIG. 2, in an exemplary embodiment, a block diagram illustrates an electronic device 4400, which may be used in the system or the like. The term "electronic device" as used herein is a type of electronic device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices, which are portable and easily carried by a person from one location to another, may sometimes be referred to as a "portable electronic device" or "portable device". Some nonlimiting examples of portable devices include: cell phones, smart phones, tablet computers, laptop computers, wearable computers such as watches, Google Glasses, etc. and the like.

Figure 5:
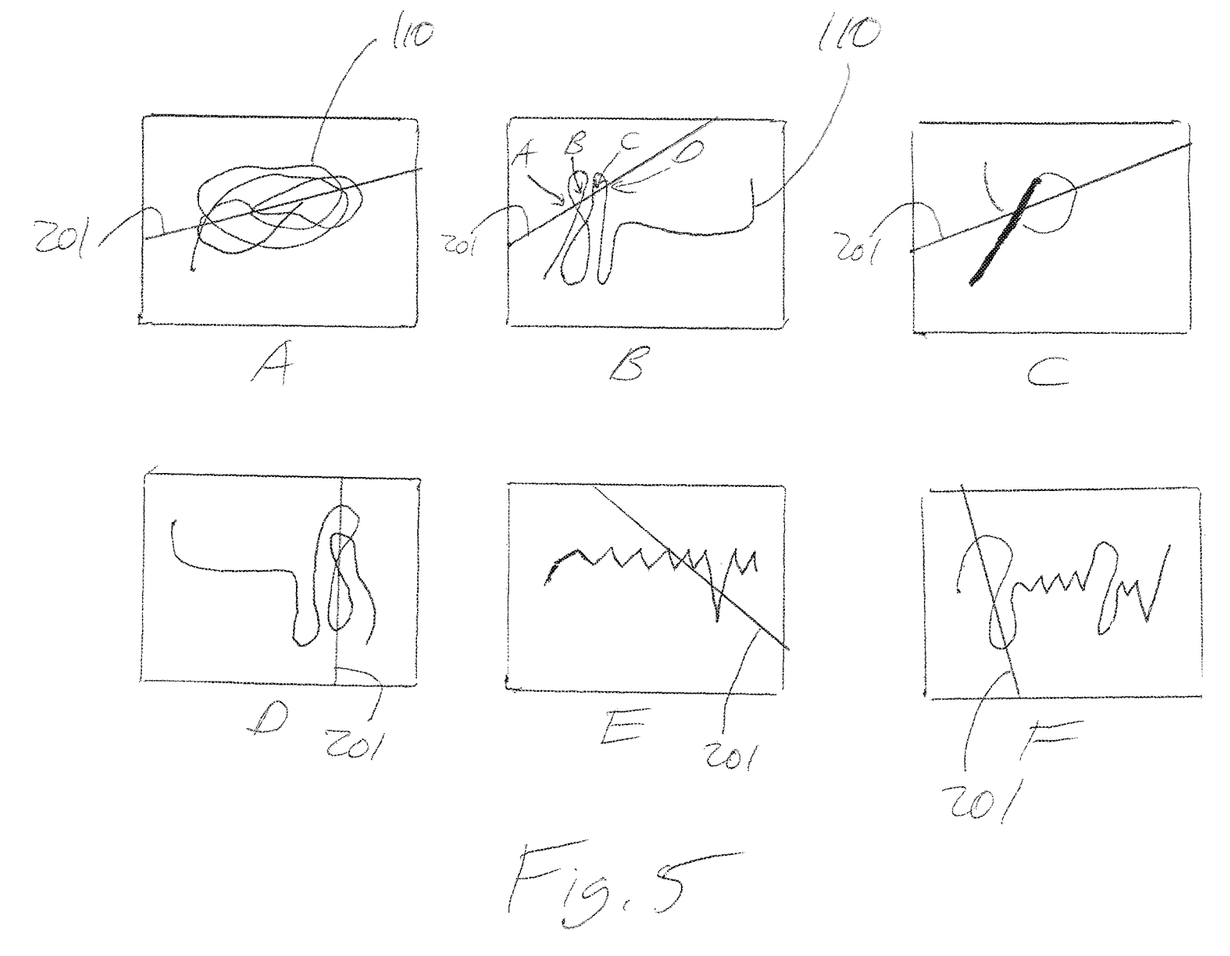
FIG. 5 illustrates exemplary images in combination with an alignment line in accordance with an exemplary embodiment of the present invention.

The electronic device 4400 can be a digital device that, in terms of hardware architecture, generally includes a processor 4402, input/output (I/O) interfaces 4404, a radio 4406, a data store 4408, and memory 4410. It should be appreciated by those of ordinary skill in the art that FIG. 5 depicts the electronic device 4400 in an oversimplified manner, and a practical embodiment may include additional components and suitably configured processing logic to support known or conventional operating features that are not described in detail herein. The components (4402, 4404, 4406, 4408, and 4410) are communicatively coupled via a local interface 4412. The local interface 4412 can be, for example but not limited to, one or more buses or other wired or wireless connections, as is known in the art. The local interface 4412 can have additional elements, which are omitted for simplicity, such as controllers, buffers (caches), drivers, repeaters, and receivers, among many others, to enable communications. Further, the local interface 4412 may include address, control, and/or data connections to enable appropriate communications among the aforementioned components.

The processor 4402 is a hardware device for executing software instructions. The processor 4402 can be any custom made or commercially available processor, a central processing unit (CPU), an auxiliary processor among several processors associated with the electronic device 4400, a semiconductor-based microprocessor (in the form of a microchip or chip set), or generally any device for executing software instructions. When the electronic device 4400 is in operation, the processor 4402 is configured to execute software stored within the memory 4410, to communicate data to and from the memory 4410, and to generally control operations of the electronic device 4400 pursuant to the software instructions. In an exemplary embodiment, the processor 4402 may include a mobile optimized processor such as optimized for power consumption and mobile applications. The I/O interfaces 4404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 4404 can also include, for example, a serial port, a parallel port, a small computer system interface (SCSI), an infrared (IR) interface, a radio frequency (RF) interface, a universal serial bus (USB) interface, and the like. The I/O interfaces 4404 can include a graphical user interface (GUI) that enables a user to interact with the electronic device 4400. Additionally, the I/O interfaces 4404 may further include an imaging device, i.e. camera, video camera, etc.

The radio 4406 enables wireless communication to an external access device or network. Any number of suitable wireless data communication protocols, techniques, or methodologies can be supported by the radio 4406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 4408 may be used to store data. The data store 4408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 4408 may incorporate electronic, magnetic, optical, and/or other types of storage media.

The memory 4410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 4410 may incorporate electronic, magnetic, optical, and/or other types of storage media.

Note that the memory 4410 may have a distributed architecture, where various components are situated remotely from one another, but can be accessed by the processor 4402. The software in memory 4410 can include one or more software programs, each of which includes an ordered listing of executable instructions for implementing logical functions. In the example of FIG. Y, the software in the memory 4410 includes a suitable operating system (O/S) 4414 and programs 4416. The operating system 4414 essentially controls the execution of other computer programs, and provides scheduling, input-output control, file and data management, memory management, and communication control and related services. The programs 4416 may include various applications, add-ons, etc. configured to provide end user functionality with the electronic device 4400. For example, exemplary programs 4416 may include, but not limited to, a web browser, social networking applications, streaming media applications, games, mapping and location applications, electronic mail applications, financial applications, and the like. In a typical example, the end user typically uses one or more of the programs 4416 along with a network such as the system.

Figure 3:
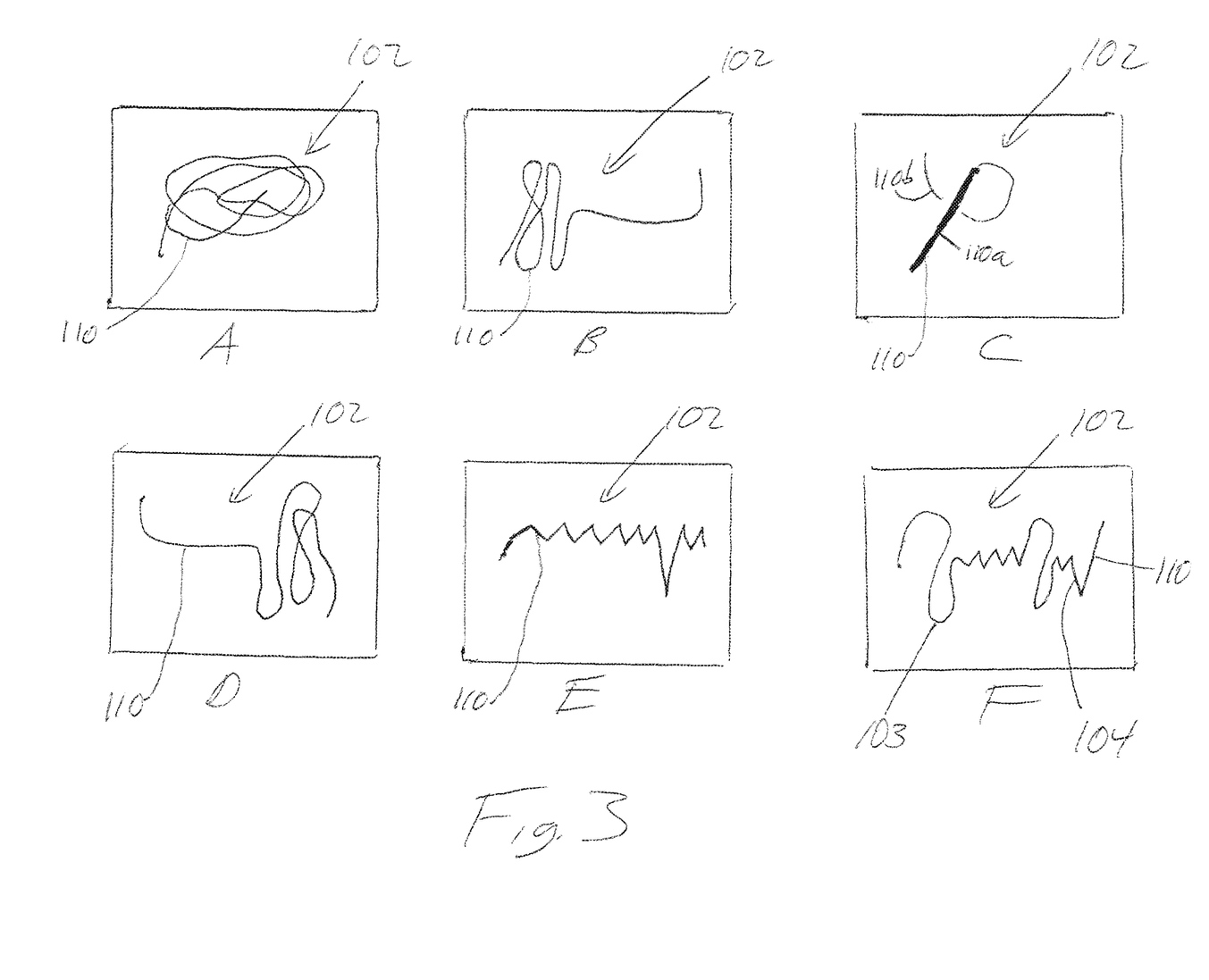
FIG. 3 illustrates exemplary images that may be used in accordance with an exemplary embodiment of the present invention.

FIG. 3 illustrates exemplary images that may be used in accordance with an exemplary embodiment of the present invention.

FIG. 3 is helpful for illustrating operations with respect to access control. FIG. 3 can be used to explain how access to a secured digital resource may be provided. Exemplary steps associated with obtaining access to a secured digital resource is further described below with reference to FIG. 8. FIG. 3 can also be used to explain how a digital resource is secured (to prevent unauthorized access). Steps associated with this operation are further described below with reference to FIG. 9. To simplify explanation, the description below first explains how access to a secured digital resource is obtained.

FIG. 3 illustrates various images 102 that may be used to control access to a digital resource. Using a display (for example, a display associated with electronic device 4400), a user who seeks to access a digital resource may be provided with images A, B, C, D, E, F that are illustrated in FIG. 3. These images are merely exemplary. In an exemplary embodiment, less than all of the images 102 shown in FIG. 3, once selected, enable access to a digital resource. In a further exemplary embodiment, only one of the images shown in FIG. 3 provides access to a digital resource.

In other words, one or more images shown in FIG. 3, if properly selected, provides access to a secured digital resource. Furthermore, one or more of the images shown in FIG. 3 are decoys—their selection does not result in access to a secured digital resource. It is up to the user to know which image 102, once selected, will provide access to the digital resource for which access is desired.

After the user selects the correct image(s) (which possibly may occur before or after other security steps are completed) access to the desired digital resource is provided.

Each image 102 that appears in FIG. 3 has several characteristics that are noteworthy. Each image may be called a "wireframe" in view of the wire-like look of each image. Each image is comprised of one or more lines (sometimes called "base lines"). Some images may have one or more base lines with non-linear section 103. In the example shown in FIG. 3, images A, B, C, D and F all have non-linear sections (i.e. sections that are not straight). Some images shown in FIG. 3 may also have a line with sections that extend in multiple directions. Image F illustrates further sections 104 that extend in multiple directions. Further sections 104 may be, for example, straight.

The one or more base lines shown in each image A, B, C, D, E, F may be referred to as lines or base lines 110. Some base lines 110 go in multiple directions. Line 110 shown in image A intersects itself multiple times. Line 110 shown in image B intersects itself twice. Line 110 shown in image E does not intersects itself, although this is merely exemplary. Any line 110 can have non-linear sections, linear sections, sections extending in multiple directions, curved sections, sharp edged corner sections, or any combination thereof (or multiple combinations thereof, or all combinations thereof). Any line 110 may be in various colors. For example, there may be a version of image B in which line 110 is red, and there may be another version of image B in which line 110 is blue. It is also possible for a single line 110 to have multiple colors (e.g. blue, followed by green, followed by red, etc.). Line 110 may alternatively (or in addition) be displayed with various thicknesses. One version of line 110 may be very thin while another version of 110 may be thicker. It is also possible to have two versions of line 110 with common shape and different thicknesses. For example, there may be a version of image B with a thin line 110 and there may be another version of image B with a thick line 110. As another example, lines may be rendered with various consistencies, for example solid, dashed, dotted, etc. Again, it is possible for two lines of similar shape to have different consistency. Line 110 may have a pattern embedded in the line itself. Line 110, for example, may be comprised of adjacent squares, adjacent triangles, polkadots within parallel lines, etc. In yet another example, line 110 may be a three-dimensional rendering. For example, in image C, there is a foreground section 110a and a background section 110b each appears to be behind 110a. Forming line 110 so that it appears to be three-dimensional may be accomplished, for example by making foreground section 110A thicker than background section 110B, and/or rendering background section 110B with a discontinuity where it crosses under foreground line 110A.

A description now follows regarding how the images shown in FIG. 3 may be used to gain access to a secured digital resource.

First, the exemplary images shown in FIG. 3 are displayed on a screen of one who desires to gain access to a secured digital resource. In an exemplary embodiment of the present invention, one secured digital resource is associated with one or more images, and in order to gain access to the secured digital resource, it is up to the user to correctly select the one or more images that are associated with the secured digital resource. The images that appear in FIG. 3 may be obtained, for example, from an image library. Alternatively, the user may provide the image (for display to that user) from a device such as a memory stick, smart phone, or digital key (communicated using any form of communication including text, email, NFC, etc.). In one embodiment, images provided from the library are shown to the user in combination with a further image obtained from the user. In another embodiment, the image obtained from the user may be displayed without displaying other images from a library. In a further embodiment, some images are generated "on-the-fly" when the user desires to view images in order to obtain access to a secure digital resource. In such an example, the images generated on-the-fly may be decoys that are displayed in combination with a prestored image associated with the secure digital resource. In this example, the intention is for the user to not be given access to the secured digital resource unless the user is able to tell which image is indeed associated with the secured digital resource (and which image(s) is not associated with secured digital resource).

Figure 4:
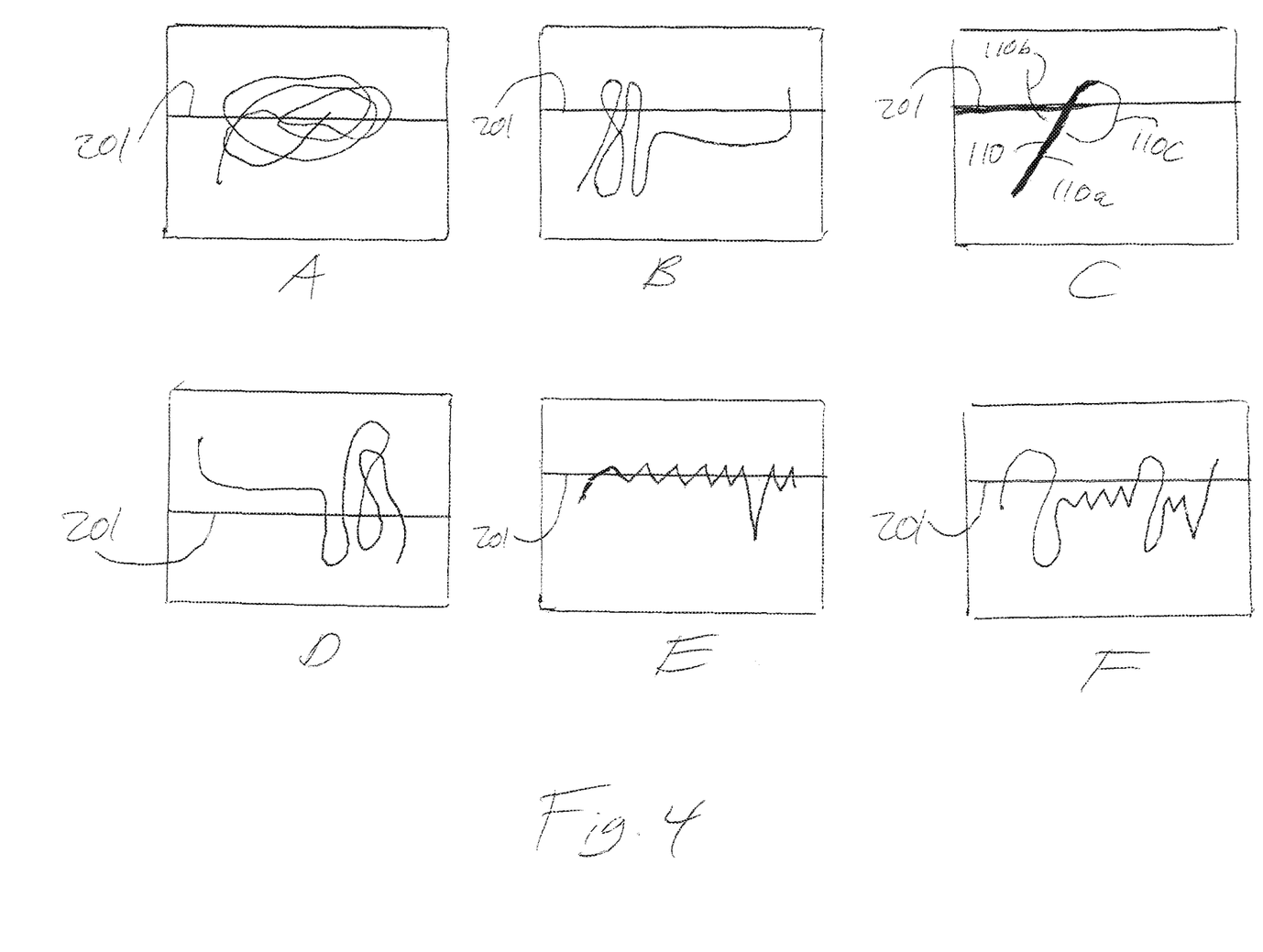
FIG. 4 illustrates exemplary images in combination with an alignment line in accordance with an exemplary embodiment of the present invention

FIG. 4 illustrates exemplary images in combination with an alignment line in accordance with an exemplary embodiment of the present invention.

FIG. 4 illustrates the use of alignment line 201. Once an image(s) is selected from the images shown in FIG. 3, the user then selects alignment line 201 to intersect line 110 on the selected image. FIG. 4 shows various images, each with respective line 110 that is intersected by alignment line 201. In one embodiment, once a user selects one or more images from FIG. 3, the display is limited to displaying the selected images. Alternatively, unselected images may continue to be displayed, but alignment line 201 may be only shown in combination with the selected image(s).

Alignment line 201 may be selected based on several examples. In one example, one alignment 201 is automatically provided at a predetermined location. In another example, one alignment line 201 is selected from a menu. In one example, alignment line 201 is created by free form (or with partial assistance). In one example, alignment line 201 may be approximated.

Just as line 110 may have many different visual characteristics, alignment line 201 may also have many different visual characteristics. Alignment line 201 may have various colors (or a combination of various colors). Alignment line may have varying levels of thickness. Alignment line 201 may have an internal pattern. Alignment line 201 may be in various positions within image 102. For example, image D shows alignment line 201 lower on the image that appears in image a. Alignment line may have more than one of the characteristics exemplified above, and/or other characteristics. Characteristics may be specified by a user, or selected from a menu, for example.

FIG. 5 illustrates exemplary images in combination with an alignment line in accordance with an exemplary embodiment of the present invention.

FIG. 5 illustrates that alignment line 201 need not be horizontal. As shown in FIG. 5, alignment line may be vertical, or it may be at an angle between 0 and 90°. Also, while alignment line 201 is depicted in FIG. 5 as being straight, alignment line 201 need not necessarily be straight, and may have curves, angles, etc.

Figure 6:
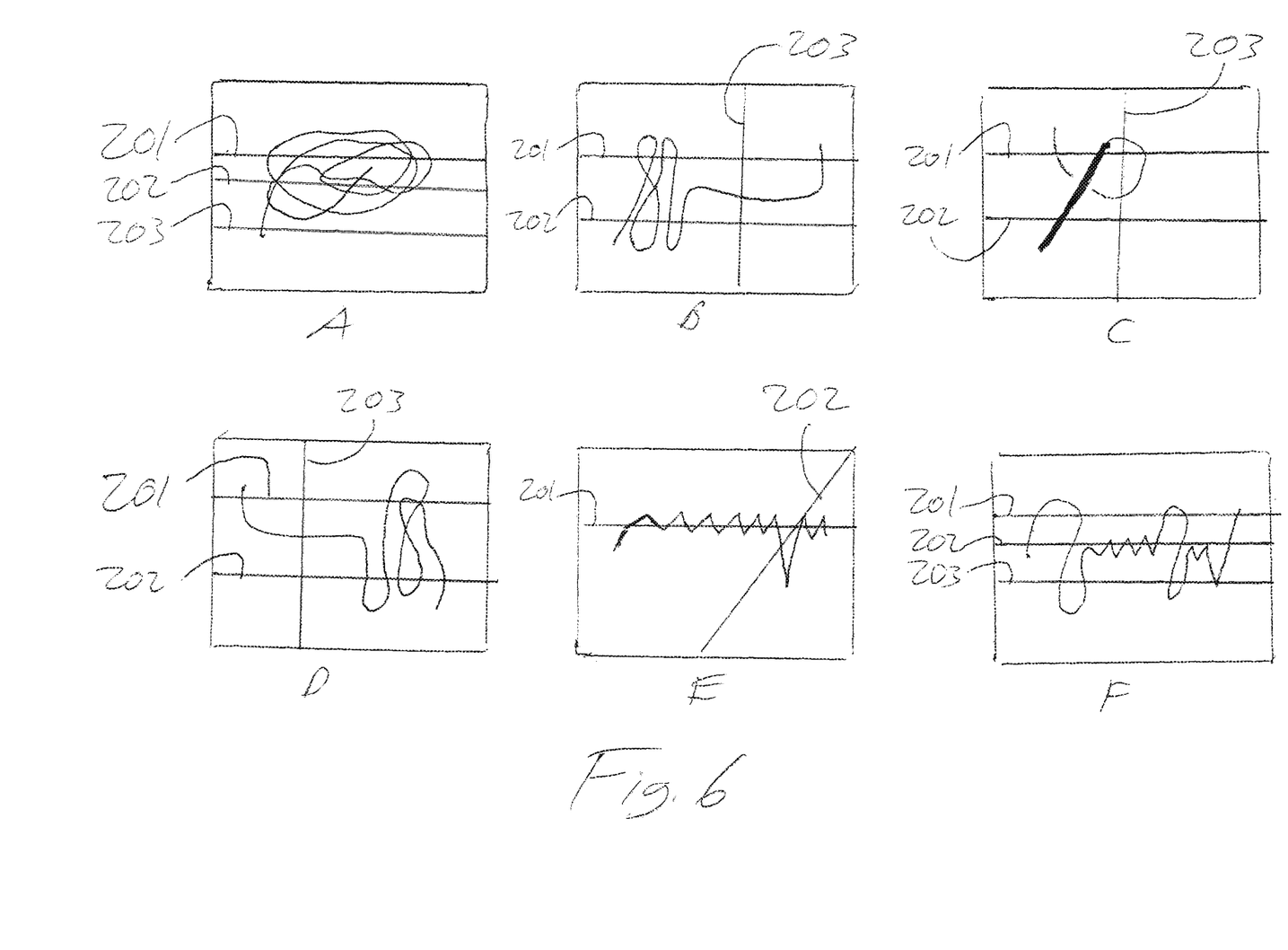
FIG. 6 illustrates exemplary images in combination with multiple alignment lines in accordance with an exemplary embodiment of the present invention.

FIG. 6 illustrates exemplary images in combination with multiple alignment lines in accordance with an exemplary embodiment of the present invention.

While FIG. 4 and FIG. 5 illustrate a single alignment line 201, in exemplary embodiments of the present invention, there may be multiple alignment lines. FIG. 6, for example, illustrates how there may be alignment lines 201, 202, and 203. As shown, it is possible that the three alignment lines may be in any orientation. For example, in image A, the three alignment lines are all horizontal. In images B, C, and D, two of the alignment lines are horizontal while a third alignment line is vertical. In image E, one alignment line is horizontal while another alignment line is at an angle. Each of the alignment lines may have any orientation relative to each other, the alignment lines shown in the images in FIG. 6 are merely exemplary.

Access to a secured digital resource is obtained when the correct image (for example from the images shown in FIG. 3, or others) is selected, and the (correct) alignment line for an image is placed on the selected image so that it intersects line 110 at the correct location(s). What is meant by "correct" location is that intersection location (for a certain image and a certain alignment line) that has been previously associated with a secured digital resource for which access is desired. If the user correctly selects alignment lines that intersect line 110 at the intersection locations previously associated with (or prestored) for a secured digital device, the user is then given access to that secured digital device.

For example, in image B of FIG. 5, alignment line 201 intersects line 110 at locations marked by A, B, C, and D. Locations A, B, C, and D within image B each have numerical addresses (based on a screen location or a display buffer address associated with those places of intersection. Those addresses of intersection are prestored (or associated with) a secured digital device. If the user places alignment line 201 on line 110 in image B so that alignment line 201 intersects line 110 at locations A, B, C, and D, and locations A, B, C, and D have been previously associated with a secured digital resource, access to that secured digital resource is given.

Figure 7:
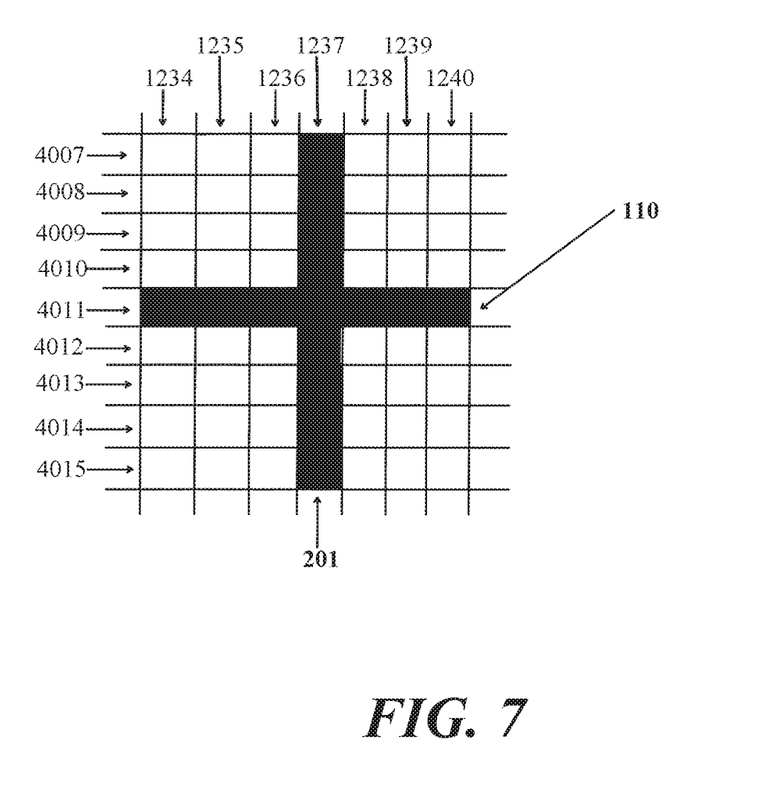
FIG. 7 is a diagram that provides a close-up view of intersection between an alignment line and a base line in accordance with an exemplary embodiment of the present invention.

FIG. 7 is a diagram that provides a close-up view of intersection between an alignment line 201 and an image line 110 in accordance with an exemplary embodiment of the present invention.

FIG. 7 thus provides a partial illustration showing the addresses of places where line 110 and alignment line 201 intersect (line 110 and alignment line 201 may extend further than what is shown in FIG. 7. In one exemplary embodiment, images 102 appear on a screen of pixels where pixels are arranged in rows and columns. Each pixel has an address based on the respective row and column in which it resides. While this explanation is described with regard pixels, other addressing mechanisms may also be used, such as a form of virtual pixelation, multiple pixels that extend along the width of the displayed line so that the line appears with thickness, voxels for a three-dimensional embodiment, etc. In the example shown in FIG. 7, line 110 extends along the pixels shown in row 4011, and extends across various columns (the area where it extends across columns 1234 through 1240 is shown in FIG. 7, although line 110 may extend further than what is shown in FIG. 7). Alignment line 201 extends down column 1237 and extends across multiple rows (the portion of line 201 that extends between row 4007 and 4015 shown, although alignment line 201 may extend further than what is shown in FIG. 7). As shown in the FIG. 7, line 110 and alignment line 201 intersect at coordinate 4011, 1237. Thus, coordinate 4011, 1237 has previously been associated with the secure digital device for which access is desired. During actual operation, if a user places alignment line 201 over line 110 so that they intersect the coordinate 4011, 1237, this satisfies at least one of the requirements for gaining access to the secured digital device. As previously explained, other criteria may also need to be satisfied in order to gain access to the secured digital device, such as causing line 110 to intersect alignment line 201 at other prestored intersection points, selecting line 110 with other characteristics that have been prestored with respect to line 110 (as described above, color, pattern, etc.) and/or selecting alignment line 201 so that it also has prestored characteristics associate with the secure digital device (again, other features, for example one or more of the examples given above.

In a further exemplary embodiment, various gray scales may be used in addition or as an alternative to coloring each wire. Such an embodiment may be useful when a user is, for example, color blind.

With regard to the above word "places," various mechanisms may be provided for selecting characteristic of alignment line 201 and where alignment line is placed on line 110 (in order to provide access to a secured digital resource). Characteristics of alignment line 201 can be selected from a menu, or controls may be provided to visually manipulate alignment line 201 on a screen on which line 110 is displayed.

It should be emphasized that placing alignment line 201 so that it intersects line 110 at prestored locations associated with a secured digital resource may be sufficient to gain access to that resource, but in other embodiments other correct choices may need to be made as well (including but not limited one or more of the options described above).

The above example has described how to access a secured digital resource. What now follows is how to create security so that a digital resource is secured. In other words, the above examples described creating proper intersection (and possibly choosing other characteristics) in order to "unlock" the secured digital resource. It is useful, however, to explain how the digital resources are "locked" in the first place.

In one exemplary embodiment, locking the digital resource so that it is secure begins by choosing an image that will be used as the basis of locking and unlocking the digital resource. In one example, images A, B, C, D, E, and F of FIG. 3 may be stored in a library, and each of those images may be displayed to user so that the user may decide which of those images will be used as the basis for locking the digital resource. In one example, the images are stored in a library for the user to choose. In another example, the images are randomly stored in the library and are randomly presented to the user so the user can choose. In another example, images are randomly generated at the time the user desires to begin the process of securing the digital resource. In yet another example, the user supplies the image that will be used as the basis for securing the digital resource. Such an image may be provided in many different ways, for example, memory stick, smart phone, email, messaging, NFC, etc.

Once one or more images (such as one or more of the images shown in FIG. 3) is selected, a user desiring to secure a digital resource next selects placement of alignment line 201 as shown in the various examples in FIG. 4. In one embodiment, a user may select alignment line 201 as simply a horizontal line. Alternatively, as shown in FIG. 5, a user may select alignment line 201 as being in a configuration other than horizontal. Alignment line 201 as previously described can be user supplied, selected from a menu, provided by an external device (memory stick), etc. As previously explained, alignment line 201 can be straight, curved, with angles, etc. A user may optionally select other criteria for line 110, alignment line 201, or both, the user may optionally select multiple alignment lines 201, 202, 203, etc. as shown in FIG. 6. Again, as an example, Alignment line 201 can be chosen from a menu, and/or controls may be provided to move alignment line 201 to desired intersection points relative to line 110. Once line(s) 110 and alignment line(s) 201 (etc.) have been selected, where the lines intersect is calculated in the manner described above, and the intersection locations are stored so that they are associated with a particular digital resource.

All of the lines described above may be stored as an image associated with server 3300 and/or electronic device 4400. When intersecting lines are stored in an image buffer, image processing software known to one of ordinary skill in the art can be used to calculate the locations where the intersections occurs. As a further example, MATLAB vectorization capabilities permits computations of intersections of lines.

Figure 8:
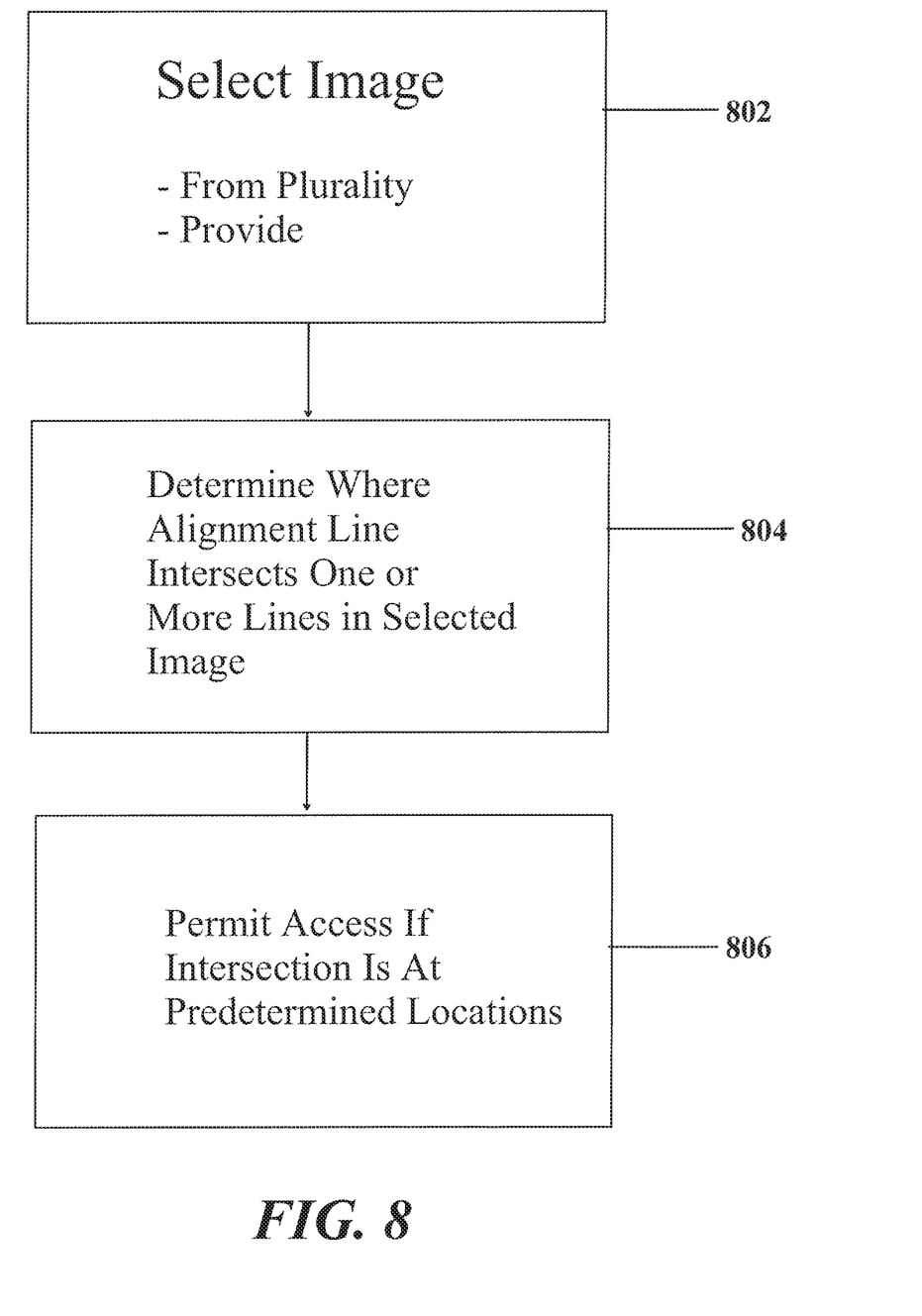
FIG. 8 is a flowchart diagram that illustrates obtaining access to a digital resource.

FIG. 8 is a flowchart diagram that illustrates how to obtain access to a secure digital resource.

At step 802, images are selected. Images may be selected from a plurality of images. Images may also, or alternatively, be provided by a user. At step 804, an alignment line is combined (or virtually combined) with the selected image, and a determination is made as to where the alignment line intersects one or more lines in the selected image. At step 806, access is permitted if the intersection(s) determined at step 804 is at predetermined locations.

If the digital resource is hardware, redirection to BIOS may occur in order to perform the steps illustrated in FIG. 8. If the digital resource is software, an executable file associated with the software may be encrypted. That executable file may be decrypted, when the steps illustrated in FIG. 8 are performed, in order to grant access to the software. These embodiments are merely exemplary.

Figure 9:
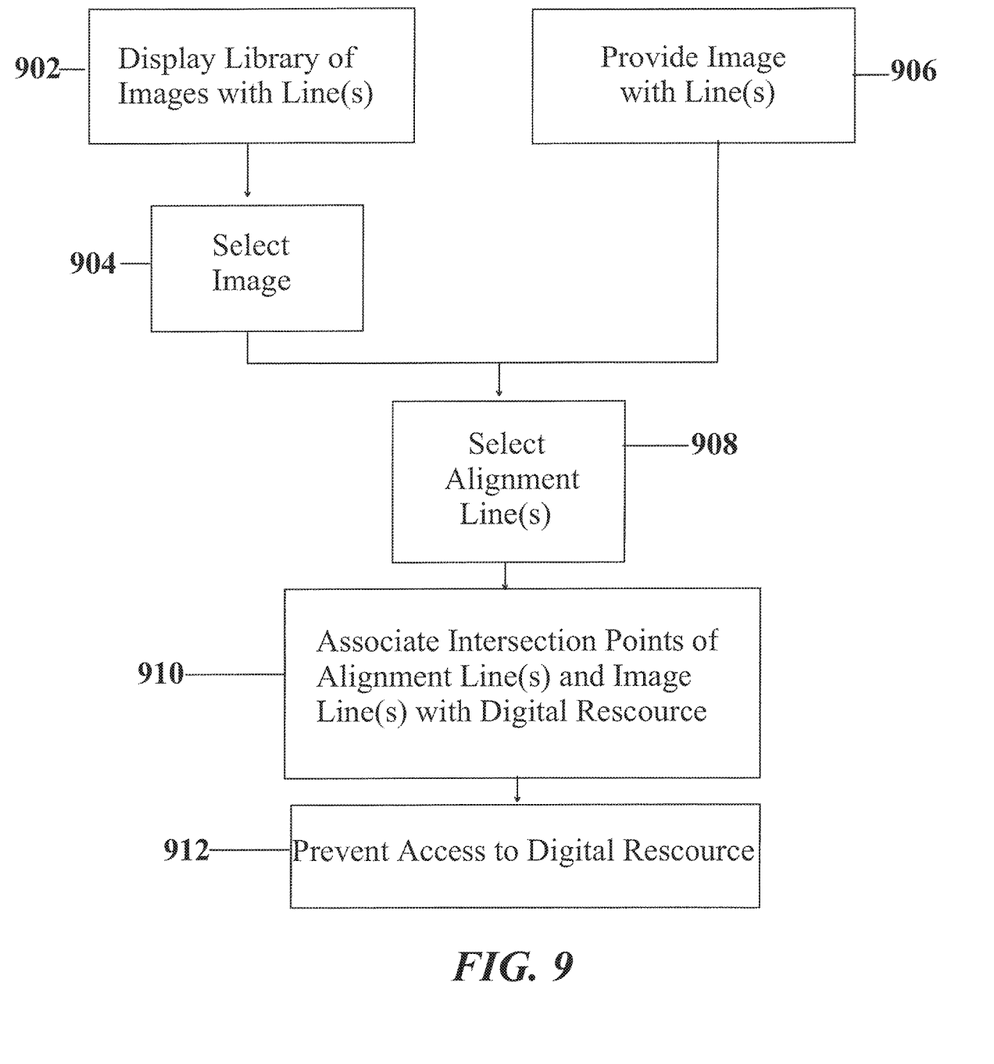
FIG. 9 is a flowchart diagram that illustrates creating access control for a digital resource, in order to prevent unauthorized access to the digital resource.

FIG. 9 is a flowchart diagram that illustrates the steps of securing a digital resource so that intersection between a line and an alignment at one or more locations must be correctly provided before access to a secure digital resource is granted.

At step 902, a library of images with lines are displayed. Alternatively, randomly generated images with lines are displayed. At step 904, one or more images are selected. Alternatively, at step 906, a user provides an image with lines. At step 908, an alignment line(s) is selected and/or positioned and/or created and/or otherwise designated. At step 910, intersection points of the alignment lines and the image lines are associated with the digital resource. At step 912, access to the digital resource is prevented.

Figure 10:
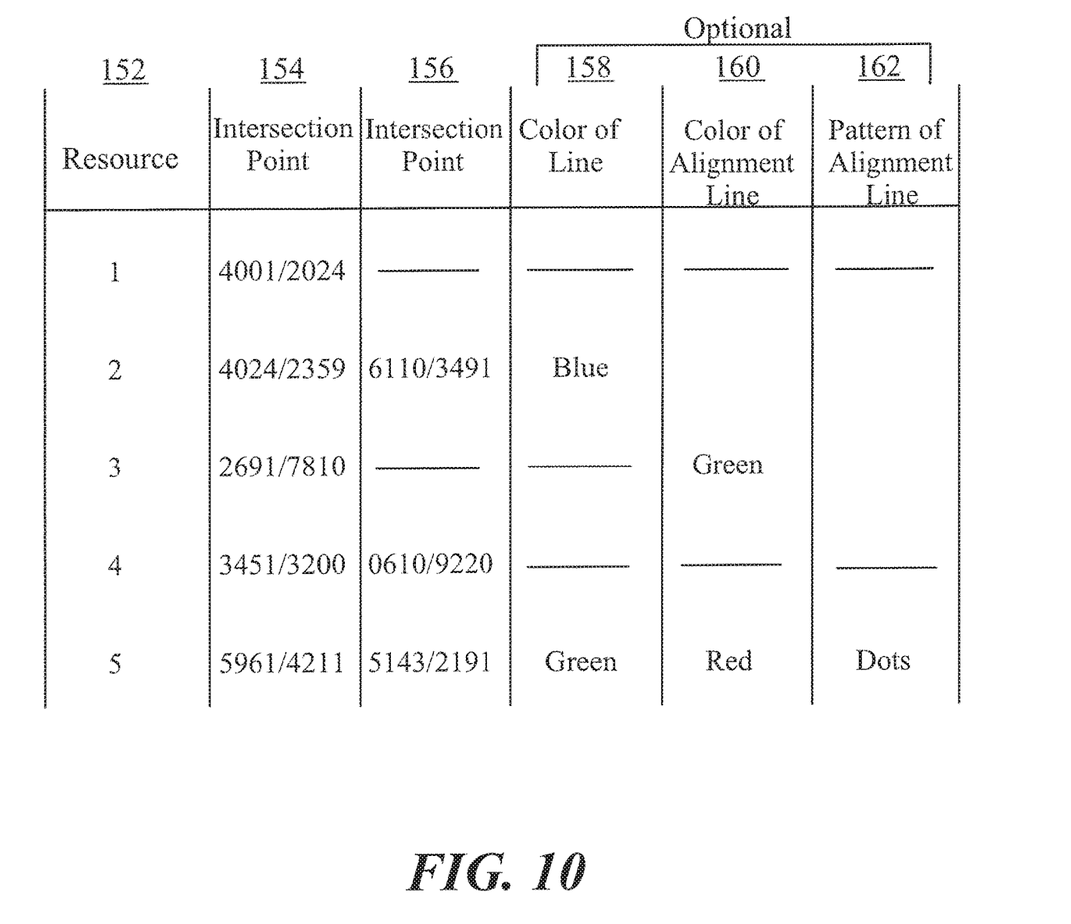
FIG. 10 is an exemplary table that may be used to control access to a digital resource. The table is populated with sample values.

FIG. 10 is an exemplary table that may be used to control access to a digital resource. The table is populated with sample values.

The table shown in FIG. 10 may be located within electronic device 4400 in order to control access to a digital resource. Digital resources are identified in column 152. Merely as an example, resource 1 may be email software, resource 2 may be a web browser, resource 3 may be an operating system, resource 4 may be a print driver, resource 5 may be a keyboard.

Columns 154 and 156 provide locations of the addresses of intersection points, i.e. the locations where line 110 and alignment line 210 intersect. As shown in the example of FIG. 10, resource 1 and resource 3 are each available when a single correct intersection point between line 110 and alignment line 210 is provided. Access to resource 3 differs from access to resource 1 in that access to resource 3 also requires that the alignment line 210 that is selected to intersect line 110 has a green color to it.

Resources 2, 4 and 5 require that there be two correct intersection points between line 110 and alignment line 210. Access to resource 2 also requires that the color of line 110 be correctly chosen as blue. Access to resource 5 requires that the color of line 110 be correctly chosen as green, color of alignment line 210 be correctly chosen as red, and alignment line 210 correctly chosen as having a pattern of dots.

An exemplary embodiment, colors for line 110 and alignment line 210 (or other characteristics of these lines) may be represented by numeric values. When access to the secured digital resource is desired, the line 110 and or alignment line 210 that is displayed also have associated with them a numeric value based on their respective color. If a numeric value associated with the color (or other characteristic) in the table shown in FIG. 10 matches a numeric value associated with color (or other characteristic) when access to the digital resource is desired, then the access is granted.

FIG. 10 shows examples where one intersection point or two intersection points are required to obtain access to a secure digital resource, although this is merely exemplary. The table shown in FIG. 10 may be expanded with the capability to store more than two intersection points that must be matched before access to a digital resources granted.

Many of the above examples have been with regard to a two-dimensional representation of line 110 and alignment line 201. In a further exemplary embodiment of the present invention, matching required intersections may occur in three-dimensional space. For example, as shown in FIG. 4C, alignment line 201 and line 110 are both three-dimensional lines. The left side of alignment line 201 is in the foreground while the right side of alignment line 201 is in the background. Section 110a is in the foreground, while sections 110b and 110c are in the background. In this three-dimensional configuration, alignment line 201 intersects portion 110a and 110c but does not intersect portion 110b. Thus, three-dimensional coordinates can be used to determine whether line 110 and alignment line 201 intersect each other at any location thereof in three-dimensional space.

In a further exemplary embodiment, a certain amount of "slop" may be permitted as to where line 110 and alignment line 201 intersect. In such an embodiment, it may not be necessary for line 110 and alignment line 201 to correctly intersect (to provide access to a secured digital resource) as long as the two lines are within a predetermined distance relative to each other. For example, if 5 positions of separation is permitted for two lines to be considered "intersecting", if indeed the 2 lines are no more than 5 positions apart then they will be treated as if they have intersected at the point stored in the table exemplified in FIG. 10.

While line 110 has been depicted in the figures as a simple line within image 102, line 110 may be embedded in another image, for example a color image. For example, line 110 may be the edges of a color image.

One or more of the embodiments described above may be used in combination with the features illustrated in FIG. 1, the features illustrated in FIG. 2, the features illustrated in a combination of FIG. 1 and FIG. 2, and/or some other type of computerized or electronic device. With regard to any such features, the digital resource(s) described above may be hardware, software, or some combination thereof.

The above exemplary embodiments solve one or more technical problems with regard to computer security. In particular, short alphanumeric passwords may be easily vulnerable to hacking while long alphanumeric passwords may be difficult to remember. By using images to protect a digital resource, a number of advantages are obtained. First, the image cannot easily be copied by hand—this by itself creates a level of security. In addition, it may be easier for a user to recall an image from a menu of images then to recall an alphanumeric password. By using an image for digital resource protection, a user can recall that image from a menu of images and subsequently gain access to a secured digital resource.

Features found in one exemplary embodiment may be combined with features found in another exemplary embodiment.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC)

microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions (e.g., reference generation module) embodying any one or more of the methodologies of functions described herein. The reference generation module may also reside, completely or at least partially, within main memory and/or within processing device during execution thereof by computer system; main memory and processing device also constituting machine-readable storage media. The reference generation module may further be transmitted or received over a network via network interface device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. A method of controlling access to a digital resource, said method comprising the steps of:
  enabling an image of a plurality of images to be selected by a user requesting to access the digital resource, each of said image including a base line and an alignment line different from said base line, wherein said base line having a) non-linear sections, b) sections extending in multiple directions, or c) both non-linear sections and section extending in multiple directions, and wherein said alignment line and said base line are displayed in said image prior to said image being selected by the user;
  determining one or more locations where said alignment line intersects said base line in said selected image;
  permitting access to said digital resource if said one or more locations are determined to be one or more predetermined locations in said image associated with said digital resource prior to said determining such that the user is not permitted to access the requested digital resource unless the user can distinguish which image is indeed associated with the requested digital resource.

2. A method according to claim 1, said method further comprising the steps of:
  selecting said image;
  causing said alignment line to intersect said base line at said one or more locations;
  determining said one or more locations and associating said one or more locations with said digital resource so that said one or more locations are said one or more predetermined locations; and
  blocking access to said digital resource.

3. A method according to claim 1, said method further comprising the steps of:

selecting said alignment line based on said alignment line having a physical feature; and permitting access to said digital resource if said physical feature is determined to be a predetermined physical feature associated with said digital resource.

4. A method according to claim 3, wherein said physical feature is selected from the group consisting of color, pattern and thickness.

5. A method according to claim 1, said method further comprising the steps of:

selecting said base line based on said base line having a physical feature; and permitting access to said digital resource if said physical feature is determined to be a predetermined physical feature associated with said digital resource.

6. A method according to claim 5, wherein said physical feature is selected from the group consisting of color, pattern and thickness.

7. A method according to claim 1, wherein said alignment line is one of a plurality of alignment lines.

8. A method according to claim 1, wherein said base line is represented in 3D space.

9. A method according to claim 1, wherein said one or more locations are stored as numerical coordinate values.

10. A method according to claim 1, wherein said digital resource is selected from the group consisting of hardware and software.

11. Apparatus for controlling access to a digital resource, said apparatus comprising:

a display; and a hardware processor for enabling an image of a plurality of images to be selected by a user requesting to access the digital resource, each of said image including a base line and an alignment line different from said base line, wherein said base line having a) non-linear sections, b) sections extending in multiple directions, or c) both non-linear sections and section extending in multiple directions, and wherein said alignment line and said base line are displayed in said image prior to said image being selected by the user;

determining one or more locations where an alignment line intersects said base line in said selected image;

permitting access to said digital resource if said one or more locations are determined to be one or more predetermined locations in said image associated with said digital resource prior to said determining such that the user is not permitted to access the requested digital resource unless the user can distinguish which image is indeed associated with the requested digital resource.

12. Apparatus according to claim 11, wherein said processor is further for:

allowing said image to be selected;

allowing said alignment line to intersect said base line at said one or more locations;

determining said one or more locations and associating said one or more locations with said digital resource so that said one or more locations are said one or more predetermined locations; and blocking access to said digital resource.

13. Apparatus according to claim 11, wherein said processor is further for:

permitting selecting of said alignment line based on said alignment line having a physical feature; and permitting access to said digital resource if said physical feature is determined to be a predetermined physical feature associated with said digital resource.

14. Apparatus according to claim 13, wherein said physical feature is selected from the group consisting of color, pattern and thickness.

15. Apparatus according to claim 11, said processor further for allowing said base line to be selected based on said base line having a physical feature; and permitting access to said digital resource if said physical feature is determined to be a predetermined physical feature associated with said digital resource.

16. Apparatus according to claim 15, wherein said physical feature is selected from the group consisting of color, pattern and thickness.

17. Apparatus according to claim 11, wherein said alignment line is one of a plurality of alignment lines.

18. Apparatus according to claim 11, wherein said base line is represented in 3D space in said memory.

19. Apparatus according to claim 11, wherein said one or more locations are stored as numerical coordinate values in said memory.

20. Apparatus according to claim 11, wherein said digital resource is selected from the group consisting of hardware and software.

* * * * *